2,910,449

BRAKE SHOE COMPOSITION OF PHENOL-FORM-ALDEHYDE RESIN, AN UNVULCANIZED RUBBER, ASBESTOS FIBER, IRON CHIPS, AND CARBON BLACK AND METHOD OF MAKING SAME

John B. Evans, Irwin, Pa., assignor to Westinghouse Air Brake Company, Wilmerding, Pa., a corporation of Pennsylvania No Drawing. Application February 25, 1957
Serial No. 642,314

5 Claims. (Cl. 260—38)

This invention relates to composition material and more particularly to such a material primarily intended, but not limited, for use in brake shoes for railway vehicles; this application being a continuation-in-part of my application, Serial No. 426,293, filed April 28, 1954, and abandoned following the filing of the instant application.

It is desirable that brake shoes used on railway vehicles have relatively long service life and that they do not cause excessive wear on the vehicle wheels on which they are used. Also it is of great importance that their frictional characteristics be such as to provide a high degree of braking for relatively low actuating forces in order to permit relatively light and efficient brake rigging on the vehicle, and that said frictional characteristics be uniform at all times, i.e., at various speeds of travel of the vehicle and at various temperatures of braking surface of the shoes and wheels as well as under other varying conditions of operation, such as on dry rails and rails which are wet. Up to the present time, so far as is known, no material has ever been devised which provides all of these desirable characteristics in the same shoe.

Brake shoes made of cast iron, providing in some measure the above-mentioned various desirable characteristics, have long been used, but such shoes do not provide the desired wear life and uniform braking of a vehicle over a wide range of speed, or over a wide range of temperatures of the brake shoe and wheel, or under differing conditions of the rail such as wet, dry, frosty, etc., and, as a matter of fact, cast iron shoes not infrequently cause damage to vehicle wheels due to excessive wear and/or heating of the wheel tread which results in checking of the wheels, a condition evidenced by fine cracks in the tread surface. Such checking of the wheels may prematurely require replacement or resurfacing of the wheels.

Numerous attempts have been made in the past, but so far as is known without success, to develop materials which, either in themselves or in various combinations with cast iron, would provide more nearly than do cast iron shoes in common usage, the various desirable characteristics above-mentioned.

It is accordingly the principal object of the present invention to provide a composition material particularly adapted for use as brake shoes on railway vehicles which more nearly attains all the above-mentioned desirable characteristics in the same shoe than, so far as the applicant is aware, has ever before been attained in any one shoe.

I have discovered that a certain composition material made of constituent elements in certain proportions and by the method to be described herein provides better and more stable frictional characteristics for brake shoes under the various conditions such as different wheel speeds, operating temperatures, and other variable conditions, and at the same time, provides longer wear life for the shoes and less abrading effect on car wheels than any material, heretofore known, of which brake shoes have been made.

The ingredients used in making my improved composition material for brake shoes and their constituent percentage ranges by weight are as follows:

Ingredients:

| | Percent by weight |
|---|---|
| Unvulcanized powdered rubber (natural or synthetic) | 4 to 10 |
| Phenol-formaldehyde resin | 8 to 15 |
| Asbestos fiber (short) | 12 to 20 |
| Carbon Black | 0 to 10 |
| Cast iron chips (of sizes that will pass through a ¼″ mesh screen and be retained on a ¹⁄₁₆″ mesh screen) | 60 to 75 |

For example, I find that a composition material without rubber-vulcanizing ingredients composed of 4 percent unvulcanized powdered rubber either natural rubber and/or a synthetic butadiene acrylonitrile rubber such as Hycar OR–15, 8 percent phenol-formaldehyde resins such as Durez Company's 12687 resin or "Bakelite" phenolic plastic, a product of the Bakelite Company, 13 percent asbestos fiber, and 75 percent cast iron chips within the specified size range, without carbon black will provide a shoe material possessing the desirable physical properties when made according to the methods hereinafter to be described, as well as will the composition material including 5 percent carbon black, 5 percent unvulcanized powdered rubber, 10 percent phenol-formaldehyde resin, 14 percent asbestos fiber, and 66 percent cast iron chips within the specified size range and without rubber-vulcanizing ingredients.

In carrying out the invention in the manufacture of brake shoes possessing the desired properties and characteristics, I find that the following method may be followed: accurately proportioning the above ingredients according to the above percentages by weight; suitably mixing such ingredients dry in a blending machine; forming a suitable quantity of the dry blended mixture in a mold under pressure; preheating the dry blended and molded mixture to a degree sufficient to soften the resin therein; and then placing the preformed and preheated mixture in a hot brake shoe mold and again applying pressure as by a hydraulic press, to further compact the mixture and maintain same compacted as heat from the mold hardens or cures the brake shoe so formed.

In accord with features of the invention, the object of preforming the dry blended mixture of brake shoe materials is to so compact such material as will prevent entrapment of air therein during subsequent preheating and curing operations, while the object of preheating the dry blended preformed mixture of brake shoe materials is to soften the resin in said mixture prior to subsequent application of pressure while in the mold, so that such application of pressure will be capable of effecting maximum and uniform final compaction of such materials throughout the mass of the shoe so formed as well as effecting intimate intermixing of the resins as a bonded agent with the other materials in said mixture.

Since initial application of heat to the brake shoe mixture at a temperature sufficient to cause softening of the resins therein is also capable of hardening such resin if such application of heat persists long enough, and since hardening of the resin in the mixture would preclude the obtaining of the uniform compaction and intimate intermixing of the ingredients during the subsequent application of pressure thereto, it is important that the temperature at which the dry mixture of brake shoe materials is preheated is merely sufficient to cause softening of the resins throughout the mass of the preformed brake shoe mixture without causing hardening of any of the resins in such mixture. For example, it has been found that for a five pound mixture of ingredients suitably formed in a container, uniform softening without hardening of the resin was attained by preheating such preformed mixture in an air circulating oven at 200 to 225° Fahrenheit for about thirty minutes, or, by preheating such preformed mixture in a dielectric heater of the electronic heat generator type (such as manufactured by W. T. La Rose and Associates under the trade name "Thermal") for a much lesser period of time, such as ten minutes, at temperatures ranging from 200 to 300° F.; the oven heating method requiring considerably more time to allow for penetration of heat to the interior of the preformed mass and requiring a low temperature to prevent hardening of the resin in the outer surface of such mass during the relatively long period of heat application; while the dielectric heating method, in heating simultaneously throughout such mass, speeds up the resin softening process and thereby renders the preheat temperature of the mixture less critical and much less dependent on the mass of the mixture.

The temperature of the hot mold, in which the suitable quantity of preheated and preformed materials is placed, is preferably between 300° F. to 340° F. to hasten the hardening of such materials while under subjection to a compaction pressure. At such temperature and at a compaction pressure of 3500 lbs. per square inch, the hardening may be completed in a period of about forty minutes, after which the pressure is relieved and the completed shoe is removed from the mold and allowed to cool.

It is desired to point out that, while some of the aforementioned ingredients used in my improved brake shoe have heretofore been used in various different compositions for brake shoes, nevertheless, so far as I am aware, my employment of all of these elements together and in the proportions herein specified and molding them together under conditions of heat and pressure in the absence of rubber-vulcanizing ingredients is believed to be novel and, as demonstrated by actual tests, provides a very superior brake shoe combining the desirable characteristics of a relatively high coefficient of friction, a low rate of brake shoe wear, and a low rate of wear of the conventional railway car wheel braked by such a brake shoe.

Having now described the invention, what I claim as new and desire to secure by Letters Patent is:

1. A method of making a composition friction material having characteristics making it especially suitable for use as a friction material for a brake shoe, which method comprises molding under heat and pressure a mixture consisting of, by weight, 4 to 10% unvulcanized butadiene-acrylonitrile copolymer synthetic rubber, 8 to 15% phenol-formaldehyde resin, 12 to 20% asbestos fiber, 60 to 75% cast iron chips, and up to 5% carbon black.

2. A method of making a composition friction material having characteristics making it especially suitable for use as a friction material for a railway brake shoe, which method comprises molding under heat and pressure a mixture consisting of, by weight, about 4% unvulcanized butadiene-acrylonitrile copolymer synthetic rubber, about 8% phenol-formaldehyde resin, about 13% asbestos fiber, about 75% cast iron chips, and the remainder carbon black.

3. A method of making a composition friction material having characteristics making it especially suitable for use as a friction material for a railway brake shoe, which method comprises molding under heat and pressure a mixture consisting of, by weight, about 5% unvulcanized butadiene-acrylonitrile copolymer synthetic rubber, about 10% phenol-formaldehyde resin, about 14% asbestos fiber, about 5% carbon black, and about 66% cast iron chips.

4. The method defined in claim 3, further characterized in that the cast iron chips are of such sizes as will pass through a 1/4" mesh screen and be retained on a 1/16" mesh screen.

5. A molded product made according to the method defined in claim 1.

References Cited in the file of this patent

UNITED STATES PATENTS

| 2,211,048 | Butterich | Aug. 13, 1940 |
| 2,686,140 | De Gauge | Aug. 10, 1954 |
| 2,813,843 | Shepard et al. | Nov. 19, 1957 |

OTHER REFERENCES

Ser. No. 357,662, Wildschut (A.P.C.), published April 20, 1943.

Cunnen et al.: "Rubber, Polyisoprenes and Allied Compounds," Journal Am. Chem. Soc., October 1943, pages 472–476.